(12) United States Patent
Staniszewski

(10) Patent No.: US 9,568,037 B2
(45) Date of Patent: Feb. 14, 2017

(54) MACHINE ELEMENT MOUNTING ASSEMBLY

(71) Applicant: Tadeusz Staniszewski, Hackettstown, NJ (US)

(72) Inventor: Tadeusz Staniszewski, Hackettstown, NJ (US)

( * ) Notice: Subject to any disclaimer, the term of this patent is extended or adjusted under 35 U.S.C. 154(b) by 147 days.

(21) Appl. No.: 14/723,213

(22) Filed: May 27, 2015

(65) Prior Publication Data

US 2016/0348709 A1    Dec. 1, 2016

(51) Int. Cl.
F16D 1/094 (2006.01)
F16B 29/00 (2006.01)
F16H 57/00 (2012.01)

(52) U.S. Cl.
CPC ........... *F16B 29/00* (2013.01); *F16H 57/0025* (2013.01)

(58) Field of Classification Search
CPC .................. Y10T 403/7056; Y10T 403/7052; Y10T 403/7069; F16D 1/092; F16D 1/094; F16D 1/096; F16D 1/097
See application file for complete search history.

(56) References Cited

U.S. PATENT DOCUMENTS

| | | | | |
|---|---|---|---|---|
| 2,434,152 A | * | 1/1948 | Forry | H02G 3/06 279/51 |
| 2,819,090 A | * | 1/1958 | Stenberg | F16D 1/094 279/2.03 |
| 3,003,149 A | * | 10/1961 | Grashow | H01Q 1/1207 279/48 |
| 3,142,239 A | * | 7/1964 | Meixner | G02B 7/04 359/825 |
| 3,322,890 A | * | 5/1967 | Kennedy | H01B 17/306 174/152 R |
| 3,957,381 A | * | 5/1976 | Schafer | F16D 1/093 403/16 |
| 4,364,687 A | * | 12/1982 | Adell | F16D 1/094 403/16 |
| 4,645,473 A | * | 2/1987 | Mochizuki | F16D 1/05 403/290 |
| 4,824,277 A | * | 4/1989 | Adolfsson | F16C 35/073 403/368 |
| 4,848,953 A | * | 7/1989 | Young | B25B 5/147 403/290 |
| 4,909,689 A | * | 3/1990 | Komatsu | F16B 39/36 411/222 |
| 5,067,846 A | * | 11/1991 | Staniszewski | F16D 1/096 403/259 |
| 5,123,772 A | * | 6/1992 | Anderson | F16D 1/09 403/336 |

(Continued)

*Primary Examiner* — Daniel Wiley
(74) *Attorney, Agent, or Firm* — Thomas J. Germinario

(57) ABSTRACT

A mounting assembly has a machine element with a threaded coaxial bore on a shaft, for rotation with the shaft. A split sleeve having external threads is provided and adapted to be fit into the element's threaded bore and mounted around the shaft at any desired position longitudinally and circumferentially. The threads of the split sleeve have apexes at a uniform diameter when unstressed. The threads of the split sleeve are shaped to cause contraction of the sleeve, when threaded into the element's bore, to secure gripping engagement with the shaft so that it frictionally clamps onto the machine element.

6 Claims, 1 Drawing Sheet

(56) References Cited

U.S. PATENT DOCUMENTS

| | | | | |
|---|---|---|---|---|
| 5,216,941 | A * | 6/1993 | Kolvereid | B25B 13/48 |
| | | | | 285/39 |
| 5,232,249 | A * | 8/1993 | Kolvereid | F16L 35/00 |
| | | | | 285/323 |
| 5,413,388 | A * | 5/1995 | Kolvereid | F16L 19/062 |
| | | | | 285/243 |
| 6,000,875 | A * | 12/1999 | Staniszewski | F16B 39/028 |
| | | | | 403/259 |
| 6,375,383 | B1 * | 4/2002 | Ostling | F16D 1/094 |
| | | | | 403/370 |
| 6,467,989 | B1 * | 10/2002 | Finkelstein | A47B 57/26 |
| | | | | 403/307 |
| 8,267,974 | B2 * | 9/2012 | Schlafli | A61B 17/60 |
| | | | | 606/291 |
| 8,429,804 | B2 * | 4/2013 | Anderson, III | F16D 1/05 |
| | | | | 29/456 |
| 2009/0162164 | A1 * | 6/2009 | Bohl | F16B 7/0426 |
| | | | | 411/109 |
| 2010/0247266 | A1 * | 9/2010 | Staniszewski | F16B 39/126 |
| | | | | 411/201 |
| 2012/0141201 | A1 * | 6/2012 | Anderson, III | F16D 1/094 |
| | | | | 403/374.4 |
| 2013/0315665 | A1 * | 11/2013 | Heston | F16D 1/094 |
| | | | | 403/374.4 |

* cited by examiner

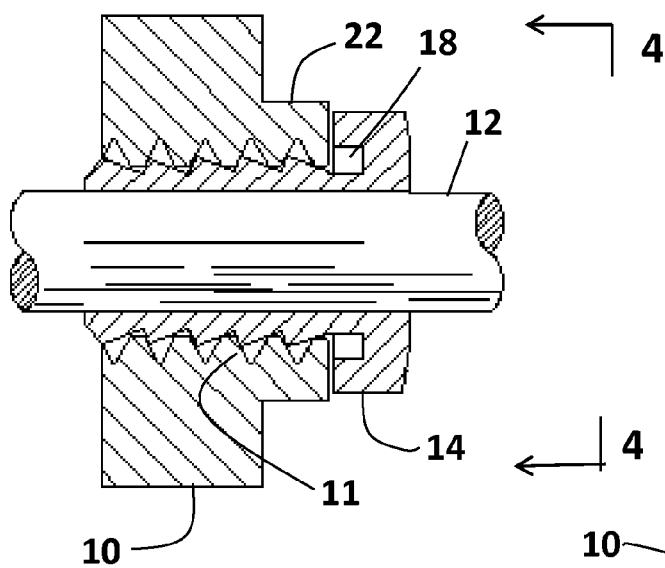
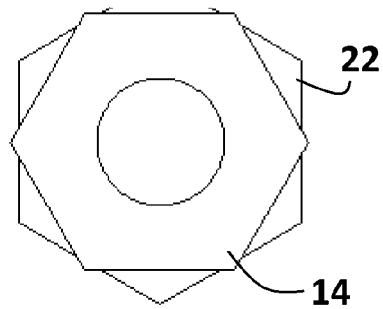
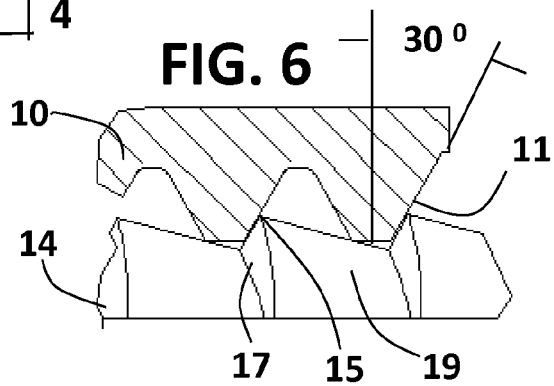
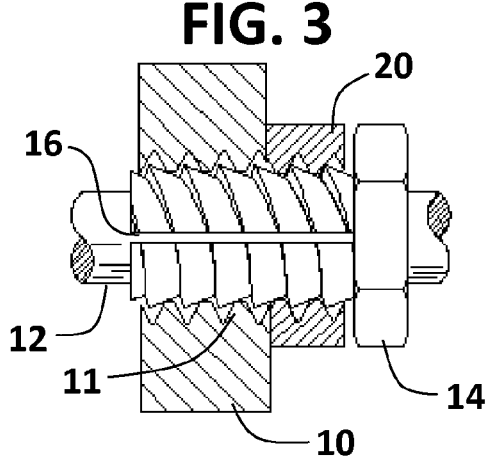
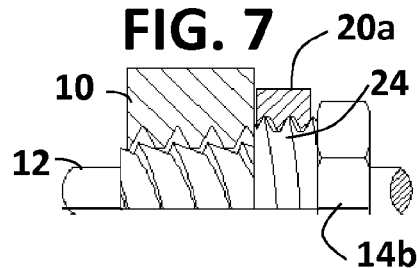
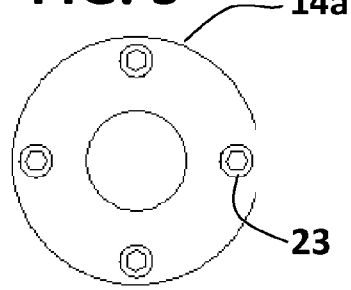
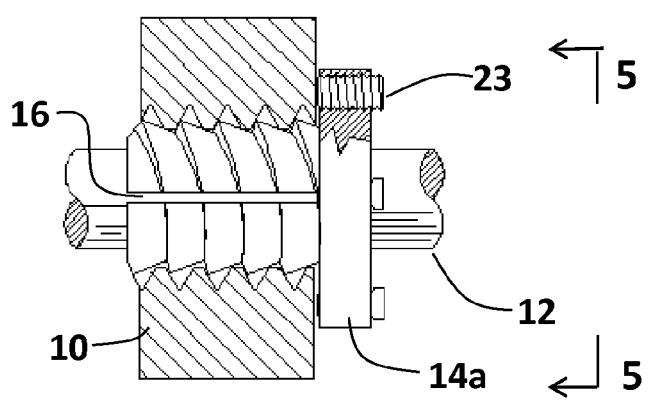

US 9,568,037 B2

MACHINE ELEMENT MOUNTING ASSEMBLY

REFERENCE TO RELATED APPLICATION

The present invention is related to that disclosed in U.S. Pat. No. 6,000,875, issued Dec. 14, 1999 to Tadeusz Staniszewski, the disclosure of which is incorporated herein by reference.

FIELD OF INVENTION

The present invention relates to the field of mounting assemblies, and, in particular, to assemblies in which a machine element with a bore is mounted coaxially onto a shaft, for common movement with the shaft.

BACKGROUND OF THE INVENTION

A common mechanical objective is to mount a gear, wheel or pulley onto a shaft for rotation with the shaft. One known system for mounting a gear to a shaft (for example U.S. Pat. No. 6,000,875) employs two coaxial, nested sleeves that are threaded together. The inner sleeve has external asymmetrical threads to be fitted with outer sleeve having internal asymmetrical threads. The inner sleeve is slit so that threading the two together compresses and shrinks the inner sleeve. The outer sleeve has a slit and expands when threaded together. Thus the nested sleeves may be placed around a shaft and inside a gear so that when tightened, the sleeves engage and center the gear on the shaft, and hold it securely thereon for rotation therewith. See also U.S. Pat. Nos. 1,380,708, 3,957,381, 4,824,281, 4,848,953 and 5,067,846.

A drawback with some of these known mounting assemblies is the number of parts required between the shaft and the machine element, where accumulation of parts demands high tolerances and makes manufacturing difficult. Therefore, there is a need for a mounting assembly which is relatively simple to make for securely mounting a machine element to a shaft coaxially, for movement with the shaft, and which requires relatively few easily manufactured components.

SUMMARY OF THE INVENTION

It is an object of this invention to meet the aforesaid need by setting forth a mounting assembly, in which a machine element having a threaded central bore is mounted, on a shaft, via said bore, for movement of said element in common with said shaft, by means of a split sleeve dimensioned to be receivable within said threaded bore. The threads of the split sleeve have apexes at a uniform diameter when unstressed. The threads of the split sleeve are shaped to cause compression of the sleeve as the sleeve engages the machine element.

The present invention is a mounting assembly in which a machine element, such as a gear, having a symmetrically-threaded central bore, is mounted coaxially on a shaft for movement in common with the shaft. A split sleeve, dimensioned to be receivable within the central bore, has external threading with an asymmetric profile, in which the outside slope conforms to the angle of the central bore's symmetrical thread. The mounting is assembled with the split sleeve threaded into the central bore, such that the outside slopes of the sleeve's threads align with the apexes of the bore threading. When the hub or nut of the machine element is torqued, the bore threads slide against the inside slopes of the sleeve threading, generating a radial force that contracts the split sleeve, causing it to grip the shaft.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

BRIEF DESCRIPTION OF THE DRAWINGS

FIG. 1 is a sectional view of an exemplary machine element mounting assembly along the axis of the shaft;

FIG. 2 is an end view of an exemplary machine element mounting assembly along lines 4-4 of FIG. 1;

FIG. 3 is a sectional view along the shaft axis of a mounting assembly that is an alternate to that of FIG. 1;

FIG. 4 is a sectional view along the shaft axis of a mounting assembly that is a second alternate to that of FIG. 1;

FIG. 5 is an end view along lines 5-5 of FIG. 4;

FIG. 6 is an enlarged detailed partial sectional view showing the thread mating between the sleeve and machine element; and FIG. 7 is a partial section view along the shaft axis of a mounting assembly that is a third alternate to that of FIG. 1.

DETAILED DESCRIPTION OF THE PREFERRED EMBODIMENT

A mounting assembly according to a first embodiment of the invention shall now be described with reference to FIGS. 1-7. A machine element 10 is shown in the form of a gear, although a wheel, pulley or other element can be employed instead. Gear 10 has a central bore 11 that is threaded with a symmetric V-shaped standard sixty degree angle (Unified Thread Standard). Since this thread is symmetrical, it will allow the sleeve 14 to be threaded into the gear's threaded bore 11 from either side. When assembly will be required, the threads can be right hand or left hand. The gear 10 in FIG. 1 has a hub 22 in hexagonal profile as shown in FIG. 2. Other profiles, e.g., square or rectangular, are optional.

The gear 10 is mounted on a shaft 12, having a cylindrical exterior. Mounted over the shaft 12 and inside the gear's threaded bore 11 is a split sleeve 14 having a split 16. The split sleeve 14 is bounded by a flange. The minor diameter of the sleeve's asymmetric threads extends inside the flange groove 18 to improve sleeve flexing. The presence of the split 16 and the extension of the minor diameter into the flange groove 18 permits radial contraction of the sleeve 14. The sleeve 14 has a threaded section. The threaded section has threads with apexes 15, as shown in FIG. 6. The apex 15 is bounded by an inside slope 19 and outside slope 17. The outside slope 17 has an angle, relative to the sleeve's axis, which conforms with the standard 60 degree angle of the central bore thread 11, as shown in FIG. 6.

It is necessary, however, that the thread profiles of the split sleeve 14 to be asymmetric. When the members 10 and 14 in FIG. 1 are finger tight, they may be tightened further with a wrench or other appropriate tool. As axial pressure is increased by threading members 10 and 14, the crests of the standard female gear threads 11 slide firmly against the entire inside slope 19 of the sleeve 14. The resulting wedge action creates strong radial forces on the sleeve 14, which contracts the sleeve 14, causing it to grip the shaft 12. Because the sleeve 14 is of uniform diameter throughout its length, a uniform clamping force is applied along the length of the split sleeve 14.

The operation of the assembly in FIG. 3 will be explained in connection with the partial sectional view of FIG. 1. It will be appreciated that the operation of the assembly in FIG. 3 is substantially the same, except that the hex shaped hub 22 is removed, and a nut 20 is added. The nut 20 is in hexagonal configuration and is threaded with symmetric V-shaped standard sixty degree threads. The device of FIG. 3 is assembled by first threading nut 20 onto the sleeve 14 until it engages the sleeve's hex flange. Slipping the gear 10 over the shaft 12, the gear 10 is centered at the position where the gear (or other machine element) is to be positioned and made fast thereon thereafter. Now the split sleeve 14 with the assembled nut 20 is slipped over the shaft 12 and is threaded into the gear bore 11. After the gear 10 and assembled sleeve 14 with nut 20 are finger tight, they are torqued with a wrench by (a) holding the sleeve 14 hex flange with the wrench, and (b) with another wrench engaging the nut 20. Rotating nut 20 in the direction towards axially engaging with the gear 10, the standard 60 degree threads of nut 20 are engaged with the sleeve 14 outside slope 17 having a 30 degree apex angle in the uniform engagement as shown in FIG. 6. Further rotation of the nut 20 increases the axial force against the gear 10 (or other appropriate device), causing the crests of the standard female threads of the bore 11 to slide firmly against the entire inside slope 19 of the split sleeve 14, causing a contraction of the sleeve 14 diameter and a consequential compressive clamping force around shaft 12.

Referring to FIG. 4, components here correspond to previously illustrated components that have the same reference numerals unless modified. Previously mentioned machine element 10 is again mounted on shaft 12, which has a cylindrical exterior. Mounted over the shaft 12 and threaded into the gear bore 11 is a split sleeve 14a, which has a round flange in its proximal end. The round flange has a series of annular tapped holes (FIG. 5 shows 4 tapped holes), where set screws 23 are threaded in. Socket head screws or other heads may be applied. The assembly in FIG. 4 is assembled by slipping the gear 10 over the shaft 12 and centering it at the position where the gear 10 is to be positioned and fastened thereon. Then the split sleeve 14a is threaded into the gear's threaded bore 11. When the members 10 and 14a are finger tight, the set screws 23 are applied. Axial force applied by the series of annular set screws 23 causes the crests of the standard female threads 11 of the gear 10 to slide firmly against the entire sleeve inside slope 19, causing a reduction of sleeve 14 diameter and a consequential compressive clamping force around shaft 12.

A third alternative exemplary mounting assembly is illustrated in FIG. 7, in which the sleeve 14b has an augmented diameter section 24 with V-shaped standard 60° thread, wherein fine threads can be used to increase clamping force.

Although the preferred embodiments of the present invention have been disclosed for illustrative purposes, those skilled in the art will appreciate that many additions, modifications and substitutions are possible, without departing from the scope and spirit of the present invention as defined by the accompanying claims.

What is claimed is:

1. A mounting assembly comprising:
   a machine element, having a hub or nut, and having an axial central bore having a longitudinal bore axis, wherein the central bore is uniformly threaded with symmetrical, substantially V-shaped bore threading, comprising multiple bore threads, wherein each bore thread uniformly has a bore thread apex formed at an end of two sides of each thread, each side disposed at a bore thread angle with respect to the longitudinal bore axis;
   a substantially cylindrical or tubular shaft;
   a substantially tubular sleeve, having a proximal end and a distal end, and having a longitudinal sleeve axis and a longitudinal sleeve split, and having an inner sleeve surface and an outer sleeve surface, wherein the inner sleeve surface is dimensioned and configured to slidably fit over the shaft when the sleeve is uncompressed, and wherein the outer sleeve surface contains asymmetrical sleeve threading, which is dimensioned and configured to be threaded into the central bore, and wherein the sleeve threading comprises multiple sleeve threads, and wherein each sleeve thread uniformly has a sleeve thread apex, bounded on either side by an inside slope and an outside slope, and wherein the outside slope is steeper than the inside slope, and wherein the outside slope slopes at an outside slope angle, relative to the longitudinal sleeve axis, equal to the bore thread angle;
   wherein the mounting assembly is provisionally assembled with the split sleeve coaxially positioned on the shaft and with the split sleeve threaded into the central bore so that the outside slopes of the sleeve threads engage the bore thread apexes, and wherein the mounting assembly is completed with the hub or nut of the machine element torqued so that the bore threads slide against the inside slopes of the sleeve threads, thereby generating a radial force that contracts the sleeve split, causing the split sleeve to grip the shaft tightly and causing the machine element to move in common with the shaft.

2. The mounting assembly of claim 1, wherein the proximal end of the split sleeve is bounded by a flange containing an inner flange groove, and wherein a minor diameter of the sleeve threading extends within the flange groove, thereby rendering the sleeve more compressible and strengthening the sleeve's grip on the shaft.

3. The mounting assembly of claim 2, wherein the bore thread angle is sixty degrees.

4. The mounting assembly of claim 1, wherein the split sleeve further comprises, on the proximal end of the split sleeve, an integral flange containing multiple axially-disposed set screws for axial displacement of the machine element.

5. The mounting assembly of claim 4, wherein the bore thread angle is sixty degrees.

6. The mounting assembly of claim 1, wherein the bore thread angle is sixty degrees.

* * * * *